(12) United States Patent
Mirho

(10) Patent No.: US 10,157,499 B1
(45) Date of Patent: Dec. 18, 2018

(54) METHOD AND SYSTEM FOR CAPTURE OF MULTIPLE 3D OBJECT PERSPECTIVES INTO A MULTILAYERED TWO DIMENSIONAL DISPLAY

(71) Applicant: TurboPatent Inc., Seattle, WA (US)

(72) Inventor: Charles A Mirho, Lake Oswego, OR (US)

(73) Assignee: TurboPatent Inc., Seattle, WA (US)

( * ) Notice: Subject to any disclaimer, the term of this patent is extended or adjusted under 35 U.S.C. 154(b) by 112 days.

(21) Appl. No.: 15/428,854

(22) Filed: Feb. 9, 2017

Related U.S. Application Data (60) Provisional application No. 62/293,143, filed on Feb. 9, 2016.

(51) Int. Cl.
*G06T 17/20* (2006.01)
*G06T 17/10* (2006.01)
*G06T 19/00* (2011.01)
*G06T 15/20* (2011.01)

(52) U.S. Cl.
CPC .............. *G06T 17/10* (2013.01); *G06T 15/20* (2013.01); *G06T 19/006* (2013.01)

(58) Field of Classification Search
CPC ....................................................... G06T 17/20
See application file for complete search history.

(56) References Cited

U.S. PATENT DOCUMENTS

2007/0216681 A1* 9/2007 Nishida ................... G06F 17/50
345/427

* cited by examiner

*Primary Examiner* — Said Broome
*Assistant Examiner* — Jonathan M Cofino
(74) *Attorney, Agent, or Firm* — FSP LLC (57) ABSTRACT

Multiple 3D perspectives are captured on a multilayered two dimensional display. Features on a 3D model are identified and transformed to an edge wireframe snapshot and layering information from an attached components list on a foreground layer.

15 Claims, 7 Drawing Sheets

METHOD AND SYSTEM FOR CAPTURE OF MULTIPLE 3D OBJECT PERSPECTIVES INTO A MULTILAYERED TWO DIMENSIONAL DISPLAY

CROSS-REFERENCE TO RELATED APPLICATIONS

This application claims priority and benefit for U.S. Application Ser. No. 62/293,143, titled "METHOD AND SYSTEM FOR CAPTURE OF MULTIPLE 3D OBJECT PERSPECTIVES INTO A MULTILAYERED TWO DIMENSIONAL DISPLAY", filed on Feb. 9, 2016 and incorporated herein by reference in its entirety.

BACKGROUND 3D drafting is an integral part of many workflows used in developing products. While it is important to have access to 3D-enabled files, it is also important to have the ability to capture two dimensional views and label the components for other uses where using a 3D file may not be not feasible. Further, it is important to have the ability to have these occur on separate cloud-based applications.

Many users may not necessarily need the features provided in an entire Computer Aided Drafting suite, and may only need certain angles provided by a 3D model in order to show a specific component or angle. These users may contract out the bulk of their drafting work but may still need a specific visual output and the ability to delineate and number components, the instructions for which may be difficult to convey to third parties. For these users, it may be unfeasibly expensive and computing-resource-intensive to install drafting software on their computers. Further, in situations where multiple users on multiple computers in different locations may need access to a limited suite of features, it becomes even less feasible to install full-featured drafting software.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"3D environment viewer interface" in this context refers to logic to display a graphical projection of a 3D model through a graphical user interface by controlling a 3D model viewer to manipulate 3d objects in a 3D virtual environment.

"3D positionable interface" in this context refers to logic to display a 3D model on a graphical interface by controlling a 3D viewer to receive multiple 3D views and to allow for the manipulation of 3D objects.

"3D model viewer" in this context refers to a viewer for 3D models, such as a viewer for computer aided drafting files.

"Component meta information" in this context refers to logic representing information about a component or a subpart of that component.

"Components list" in this context refers to a list, tree or other data structure containing component parts or features of a 3D model.

"Edge wireframe snapshot" in this context refers to a two dimensional image depicting a perspective of a three dimensional object consisting of edges identified from a 3D model and consistent with the depicted perspective.

"Output specification" in this context refers to a specification detailing the output parameters of a given image or view to ensure proper display on a user interface.

"Relationally positioned constituent parts" in this context refers to constituent parts of a 3D model with spatial orientation and positioning in a three dimensional environment defined relative to the positioning of other constituent parts.

"Graphical user interface" in this context refers to logic to receive signals from device inputs such as a mouse, keyboard, or microphone, and to correlate those inputs with visual features rendered on an optical display. A user interface determines how a human operator interacts with and controls a device. User interfaces are comprised of elements with which the human operator interacts to affect device behavior. Examples of user interface elements are (1) command language (text): the operator inputs program-specific instructions or codes into the device, (2) menus: the operator selects elements from displayed lists, (3) buttons: the operator selects (typically by clicking the mouse cursor on) defined areas of the display.

The systems and method provide a means for capturing a three dimensional view from a 3D model viewer and creates a layered two-dimensional drawing out of it. In some embodiments, the 3D model viewer may be a CAD file viewer or editor. The system extracts surface features from the 3D model and translates the visible 3D points into a two dimensional drawing. In some embodiments the three dimensional model may be converted to an edge wireframe projection. In further embodiments, the converted 3D model may be transformed into a vector graphic. In some embodiments, the components list is used to generate a user-configurable foreground layer where the user may link the individual components within the components list to individual features of the 3D model or the edge wireframe snapshot.

In some embodiments, the system may monitor the visible areas of the 3D model which are depicted within the edge wireframe projection and actively update the display of the edge wireframe projection.

In some embodiments, the generation and storage of the 3D model may occur on a remote cloud-based server and be manipulated through a user interface which is running on another cloud-based server. In further embodiments the user interface may be accessed via a standard personal computer, tablet or other computing terminal.

In some embodiments, the method may configure a three dimensional (3D) model viewer in a first cloud with graphical data from a 3D model comprising the graphical data for at least two constituent parts from a controlled memory data structure. The method may operate the 3D model viewer to constructs the 3D model in a 3D virtual environment from the graphical data viewed through a 3D positionable viewing frustum configured by a projection view control from a user interface controller, generate a graphical projection of the 3D model through the 3D positionable viewing frustum with projection calculations distributed to a plurality of processors on the first cloud, and render the graphical projection through a 3D environment viewer interface in a graphical user interface (GUI). The method may configure an output controller with an export control from the user interface controller to generate an edge wireframe projection from the projection view control and the graphical data through operation of the plurality of processors on the first cloud, and export the edge wireframe projection to a specification drawings editor in a second cloud. The method may operate the specification drawings editor to extract constituent part names from the edge wireframe projection and assemble projected components list through control of a constructor, display the edge wireframe projection as a background layer of a technical drawing through a drawings editor panel and the projected components list in a component list panel in the GUI, and display component identifiers each linked to a different constituent part name of the projected components list in a user-configurable foreground layer in the drawings editor panel.

In some embodiments, generating the graphical projection of the at least two constituent parts of the 3D model through the 3D positionable viewing frustum through the projection calculations distributed to the plurality of processors on the first cloud may comprise culling the graphical data corresponding to subregions of the 3D model outside of the 3D positionable viewing frustum.

In some embodiments, generating the edge wireframe projection from the projection view control and the graphical data through operation of the plurality of processors on the first cloud may comprise configuring the output controller to operate a hidden edge detection algorithm to generate the edge wireframe projection in response to detecting a surface occlusion control in the export control, and culling the graphical data corresponding to subregions of the 3D model obscured by occluding surfaces of the 3D model through the 3D positionable viewing frustum.

In some embodiments, the controlled memory data structure comprises a cloud storage controlled memory data structure.

In some embodiments, the method may comprise configuring the constituent part names displayed in the component list panel as editable text nodes, generating an update control through the user interface controller in response to detecting changes to an editable text node, and operating a mapping table to rename constituent parts of the 3D model stored in the controlled memory data structure as controlled by the update control.

In some embodiments, the 3D environment viewer may allow for the manipulation of 3D objects within the 3D virtual environment. In some embodiments, the 3D mode may refer to a collection of points in 3D space connected by various geometric entities (triangles, lines, curved surfaces, etc.) representing a physical body. The 3D model may be a construct of several 3D models with positioning defined by relational interactions between geometric entities of different constituent models and/or the 3D environment. The 3D model viewer may refer to logic to construct, project, manipulate, and render 3D models in a 3D virtual environment from graphical data. The 3D positionable viewing frustum may refer to logic to represent a region of 3D space as a viewport for translating views of 3D objects modeled in the 3D space into projections viewable on a display. The 3D positionable viewing frustum may be a defined region of 3D space and/or positionable relative to objects in the 3D space. The 3D virtual environment may refer to three dimensional space for constructing 3D objects. The constituent part name may refer to meta information from a memory data structure utilized to identify parts or features of a 3D model. The 3D environment viewer interface may refer to logic to display a graphical projection of a 3D model in a graphical user interface by controlling a 3D positionable viewing frustum to receive 3D views of the model within a 3D virtual environment. The user interface controller may refer to logic for generating control and configuration commands for device logic from defined user inputs and interactions.

In some embodiments, the drawings editor panel may refer to logic to display and modify a multilayered user configurable technical drawing in a graphical user interface. In some embodiments, the edge wireframe projection may refer to a two dimensional image depicting a perspective of a three dimensional object comprising edges identified from a 3D model and consistent with the depicted perspective. In some embodiments, the editable text node may refer to logic representing information about a component/constituent part or a subpart of that component in a 3D model as an editable text object through the component list panel and stored in the mapping table.

In some embodiments, the graphical data may refer to mathematical representations of 3D objects in a 3D space as geometric entities with positioning defined by Cartesian coordinates relative to a point in 3D space, relative distance between to the geometric entities of objects in 3D space, and/or geometric relationships between objects in 3D space and/or a define point in 3D space. The projection view control may refer to control parameters for configuring the positioning of the 3D positionable viewing frustum in the 3D virtual environment relative to the 3D model. The graphical projection may refer to 2D representation of a 3D objects in a 3D virtual environment on a plane. The cloud may refer to a computing infrastructure for sharing configurable storage and computing resources in a network of devices. The plurality of processor may refer to logic or hardware circuits utilized in parallel processing or distributed calculation. In some embodiments, the projection calculations may refer to calculations of two dimensional representations of three dimensional objects on or through a two dimensional plane. In some embodiments, the surface occlusion control may refer to parameter of an export control defining opacity of 3D surfaces of a 3D model. The hidden line removal algorithm may refer to instructional logic for detecting surface edges of 3D objects hidden by opaque surfaces when projecting the 3D object to a 2D plane.

In some embodiment, the output controller may refer to logic to generate, configure, and export an edge wireframe projection of a graphical projection of a 3D model controlled by an export control from the user interface controller. In some embodiments, the export control may refer to a specification detailing the output parameters of a given image or view to ensure proper display on a graphical user interface.

In some embodiments the projected components list may refer to a list, tree or other data structure containing component parts or features of a 3D model visible through the 3D positionable viewing frustum. The component list panel may refer to logic to display constituent part names of a projected components list in a graphical user interface as editable text nodes. The mapping table may refer to logic operating a relational table for establishing parity between meta information defining the constituent parts of a 3D model and editable text nodes of a constituent part names displayed through the components list panel. In some embodiments, the constructor may refer to logic or circuit to extract information representing a component or subcomponent in 3D from an edge wireframe projection and assemble a projected component list. The update control may refer to logic to configure a stored value in a mapping table corresponding to a modified value in the components list panel.

In some embodiments, the technical drawings editor may refer to logic to generate a multilayered technical drawing from an edge wireframe projection and a projected components list through control of a constructor. A technical drawing may refer to a multilayered image for displaying projections of a 3D model on a 2D plane with an edge wireframe projection positioned on a lower z-indexed plane relative to a configurable foreground layer displaying component identifier. The user-configurable foreground layer may refer to a higher ordered z-indexed layer positioned above an edge wireframe projection in a drawings editor panel allowing positioning of component identifiers on or adjacent to a corresponding part or subregion of the edge wireframe projection. The background layer may refer to the lowest ordered z-indexed layer of a technical drawing utilized for displaying an edge wireframe projection. In some embodiment, the component identifiers may refer to graphical elements displayed in the user-configurable foreground layer associated with constituent part names of a projected components list displayed in a component list panel in a GUI.

Figure 1:
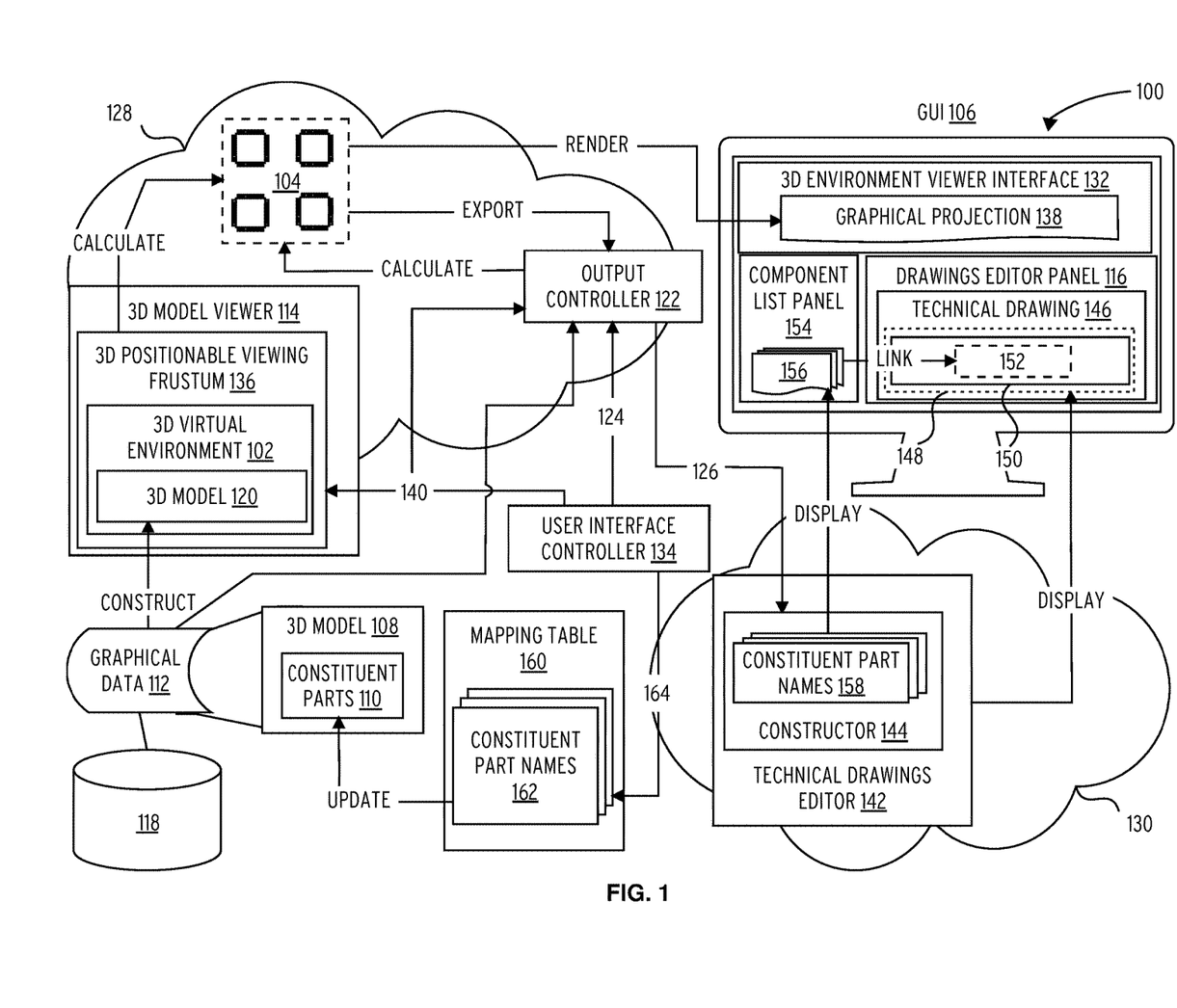
FIG. 1 illustrates an embodiment of a system for capture of multiple 3D object perspectives into a multilayer two dimensional display 100.

Referencing FIG. 1, a system for capture of multiple 3D object perspectives into a multilayer two dimensional display 100 comprises a first cloud 128, a controlled memory data structure 118, a second cloud 130, and a graphical user interface GUI 106. The first cloud 128 comprises a 3D model viewer 114, an output controller 122, and a plurality of processors 104. The 3D model viewer 114 comprises a 3d positionable viewing frustum 136 configured by a projection view control 140 to manipulate positioning within a 3D virtual environment 102. The 3D virtual environment 102 comprises a 3D model 120 constructed from graphical data 112 from the controlled memory data structure 118. The graphical data 112 comprises relationally positioned constituent parts 110 of a 3D model 108. The plurality of processors 104 generate a graphical projection 138 for display in a 3d environment viewer interface 132 in the GUI 106. The user interface controller 134 configures an output controller 122 with an export control 124. The output controller 122 generates an edge wireframe projection 126 from the graphical data 112 and the projection view control 140 through calculations performed by the plurality of processors 104. The second cloud 130 comprises a technical drawings editor 142 comprising a constructor 144. The technical drawings editor 142 receives the edge wireframe projection 126 from the output controller 122 at the constructor 144. The constructor 144 extracts constituent part names 158 from the edge wireframe projection 126 and assembles a projected components list 156. The projected components list 156 being displayed in a component list panel 154 in the GUI 106. The technical drawings editor 142 displays the edge wireframe projection 126 in a drawings editor panel 116 in the GUI 106. The drawings editor panel 116 comprises a technical drawing 146 comprising a background layer 148 and a user-configurable foreground layer 150. The edge wireframe projection 126 being displayed as the background layer 148 of the technical drawing 146. The user-configurable foreground layer 150 comprises component identifiers 152 each linked to a constituent part names 158 in the projected components list 156 of the component list panel 154. The user interface controller 134 configures a mapping table 160 comprising a constituent part names 162 with an update control 164 to update a constituent part names of the 3D model 108.

Figure 2:
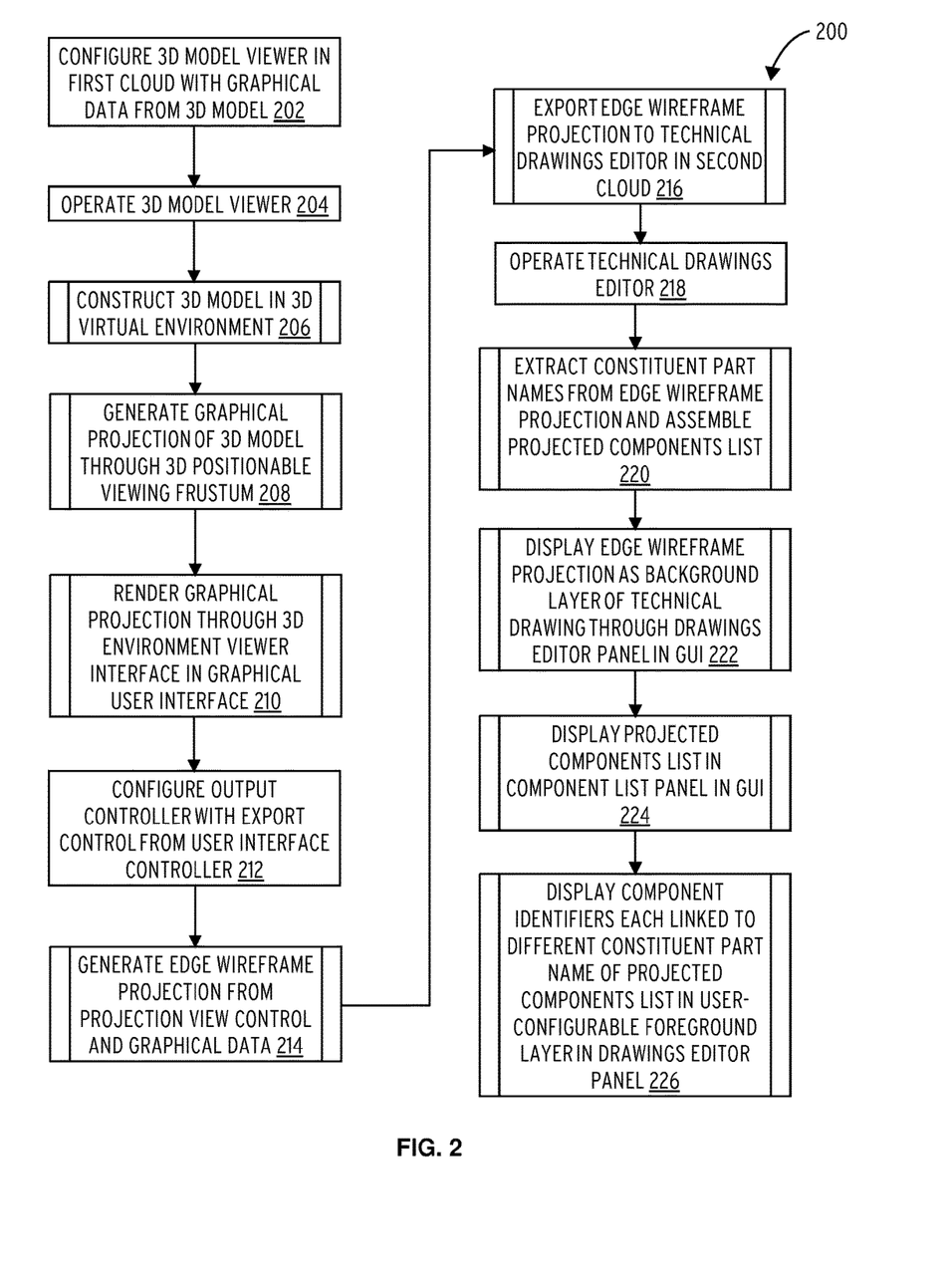
FIG. 2 illustrates an embodiment of a method for capture of multiple 3D object perspectives into a multilayer two dimensional display 200.
Figure 5:
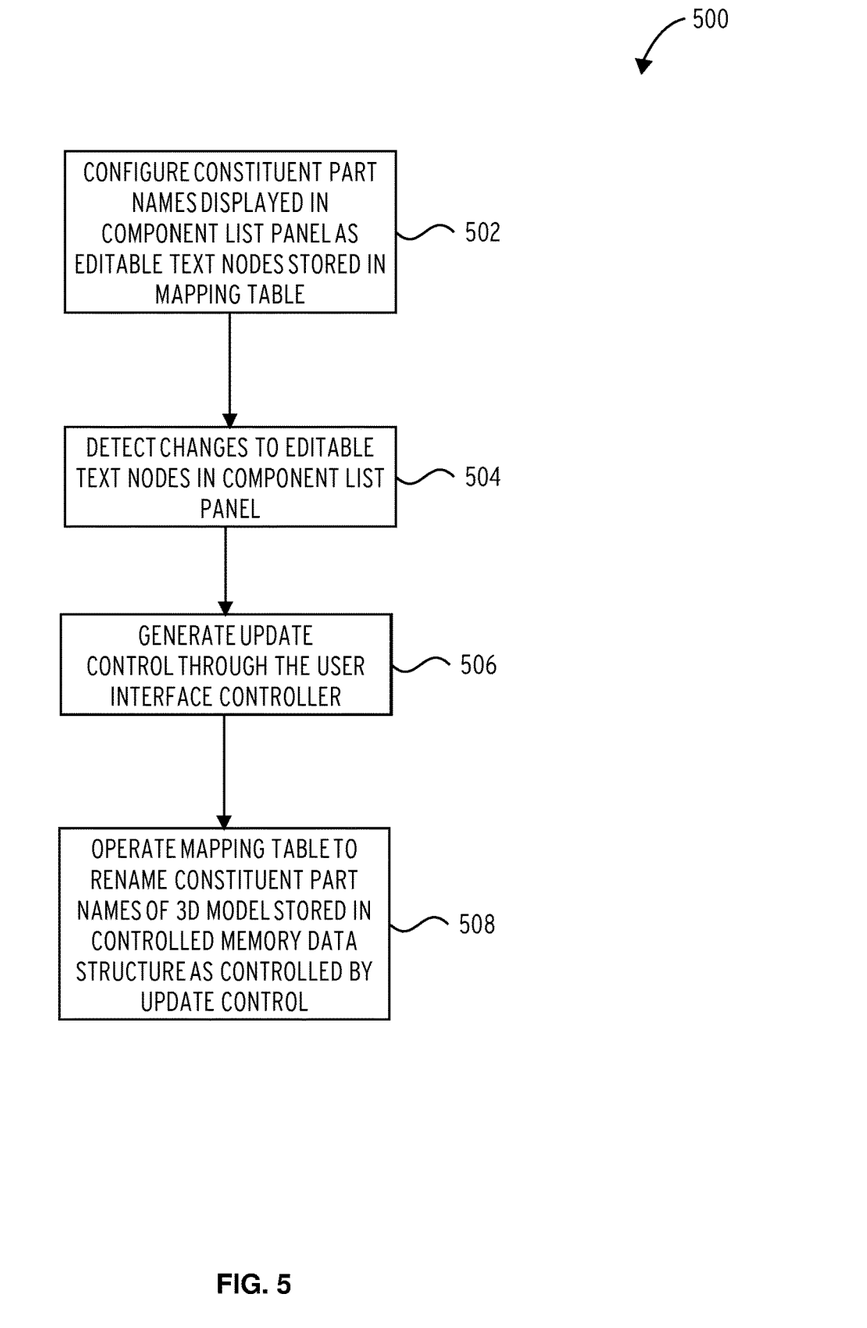
FIG. 5 illustrates an embodiment of a method for capture of multiple 3D object perspectives into a multilayer two dimensional display 500.

The system for capture of multiple 3D object perspectives into a multilayer two dimensional display 100 may be operated in accordance to the processes described in FIG. 2 and FIG. 5.

Referencing FIG. 2, a method for capture of multiple 3D object perspectives into a multilayer two dimensional display 200 configures a three dimensional (3D) model viewer in a first cloud with graphical data from a 3D model comprising the graphical data for at least two constituent parts from a controlled memory data structure (block 202). In block 204, the method for capture of multiple 3D object perspectives into a multilayer two dimensional display 200 operates the 3D model viewer. The 3D model viewer constructs the 3D model in a 3D virtual environment from the graphical data viewed through a 3D positionable viewing frustum configured by a projection view control from a user interface controller (subroutine block 206). The 3D model viewer generates a graphical projection of the 3D model through the 3D positionable viewing frustum with projection calculations distributed to a plurality of processors on the first cloud (subroutine block 208). The 3D model viewer renders the graphical projection through a 3D environment viewer interface in a graphical user interface (GUI) (subroutine block 210).

In block 212, the method for capture of multiple 3D object perspectives into a multilayer two dimensional display 200 configures an output controller with an export control from the user interface controller. The output controller generates an edge wireframe projection from the projection view control and the graphical data through operation of the plurality of processors on the first cloud (subroutine block 214). The output controller exports the edge wireframe projection to a technical drawings editor in a second cloud (subroutine block 216).

In block 218, the method for capture of multiple 3D object perspectives into a multilayer two dimensional display 200 operates a technical drawings editor. The technical drawings editor extracts constituent part names from the edge wireframe projection and assemble projected components list through control of a constructor (subroutine block 220). The technical drawings editor displays the edge wireframe projection as a background layer of a technical drawing through a drawings editor panel in the GUI (subroutine block 222). The technical drawings editor displays the projected components list in a component list panel in the GUI (subroutine block 224). The technical drawings editor displays component identifiers each linked to a different constituent part name of the projected components list in a user-configurable foreground layer in the drawings editor panel (subroutine block 226).

Figure 3:
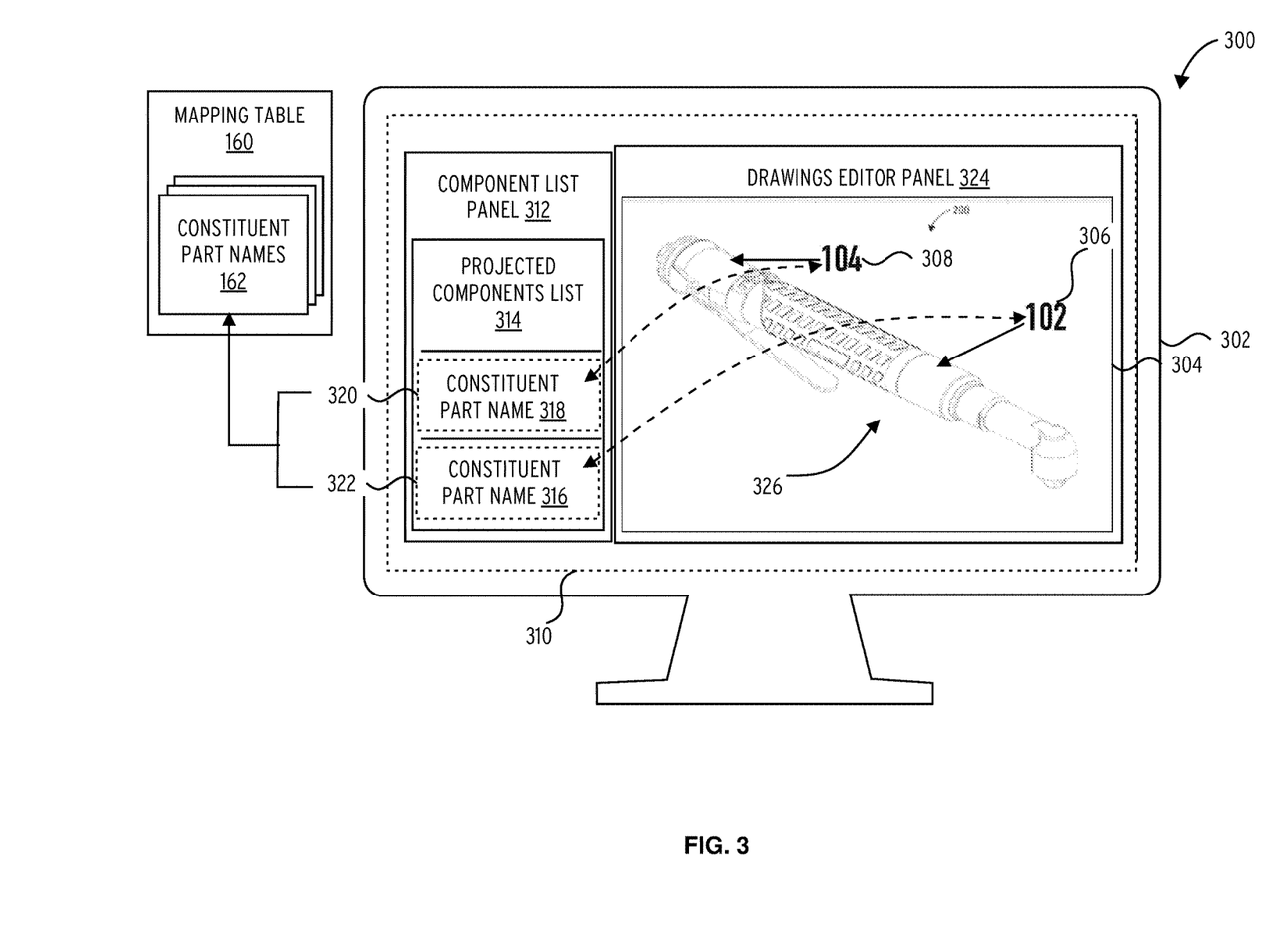
FIG. 3 illustrates an embodiment of a system for capture of multiple 3D object perspectives into a multilayer two dimensional display 300.

Referencing FIG. 3, a system for capture of multiple 3D object perspectives into a multilayer two dimensional display 300 comprises a mapping table 160 and a display screen 302. The mapping table 160 comprises constituent part names 162. The display screen 302 comprises a graphical user interface 310 comprising a component list panel 312 and a drawings editor panel 324. The component list panel 312 comprises a projected components list 314 comprising constituent part name 318 as an editable text node 320, and a constituent part name 316 as an editable text node 322. The editable text node 320 and the editable text node 322 being stored as a constituent part names 162 in the mapping table 160. The drawings editor panel 324 comprises a component list panel 312 and a technical drawing 304. The technical drawing 304 comprises a technical drawing 304 comprising an edge wireframe projection 326 of a 3D model, component identifier 308, and component identifier 306. The component identifier 308 being linked to the constituent part name 318 in the component list panel 312. The component identifier 306 being linked to the constituent part name 316 in the component list panel 312.

The system for capture of multiple 3D object perspectives into a multilayer two dimensional display 300 may be operated in accordance to the process described in FIG. 2 and FIG. 5.

Figure 4:
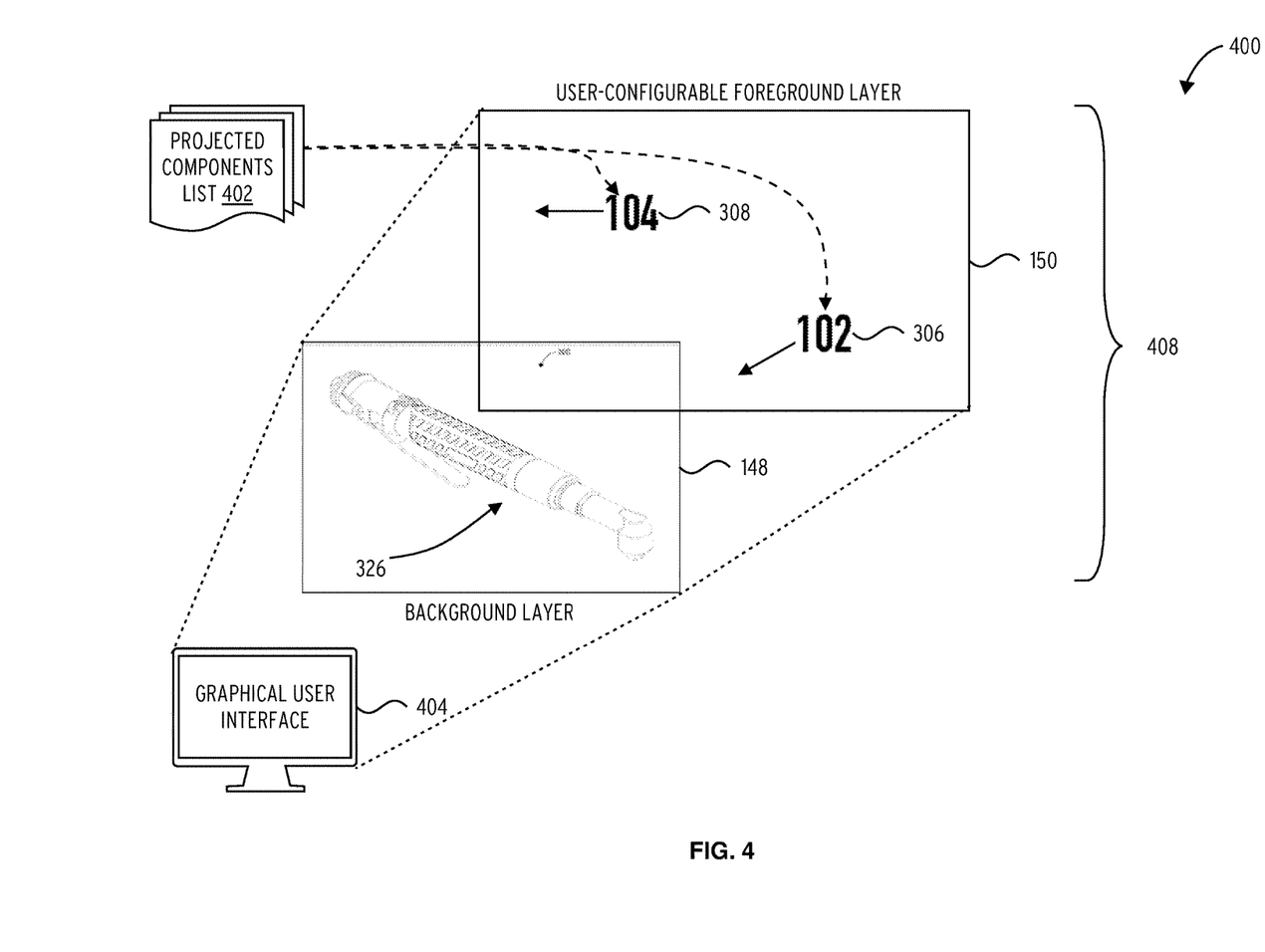
FIG. 4 illustrates an embodiment of a system for capture of multiple 3D object perspectives into a multilayer two dimensional display 400.

Referencing FIG. 4, a system for capture of multiple 3D object perspectives into a multilayer two dimensional display 400 comprises a graphical user interface 404 displaying a technical drawing 408. The technical drawing 408 comprises a user-configurable foreground layer 150 and a background layer 148. The user-configurable foreground layer 150 comprises a component identifier 308 and a component identifier 306. The background layer 148 comprises a edge wireframe projection 326. The component identifier 308 and the component identifier 306 being linked to the constituent part names in the projected components list 402.

The system for capture of multiple 3D object perspectives into a multilayer two dimensional display 400 may be operated in accordance to the processes described in FIG. 2 and FIG. 5.

Referencing FIG. 5, a method for capture of multiple 3D object perspectives into a multilayer two dimensional display 500 configures the constituent part names displayed in the component list panel as editable text nodes stored in the mapping table (block 502). The method for capture of multiple 3D object perspectives into a multilayer two dimensional display 500 detects the changes to the editable text nodes in the component list panel (block 504). The method for capture of multiple 3D object perspectives into a multilayer two dimensional display 500 generates an update control through the user interface controller (block 506). The method for capture of multiple 3D object perspectives into a multilayer two dimensional display 500 operates mapping table to rename constituent part names of the 3D model stored in the controlled memory data structure as controlled by the update control (block 508).

Figure 6:
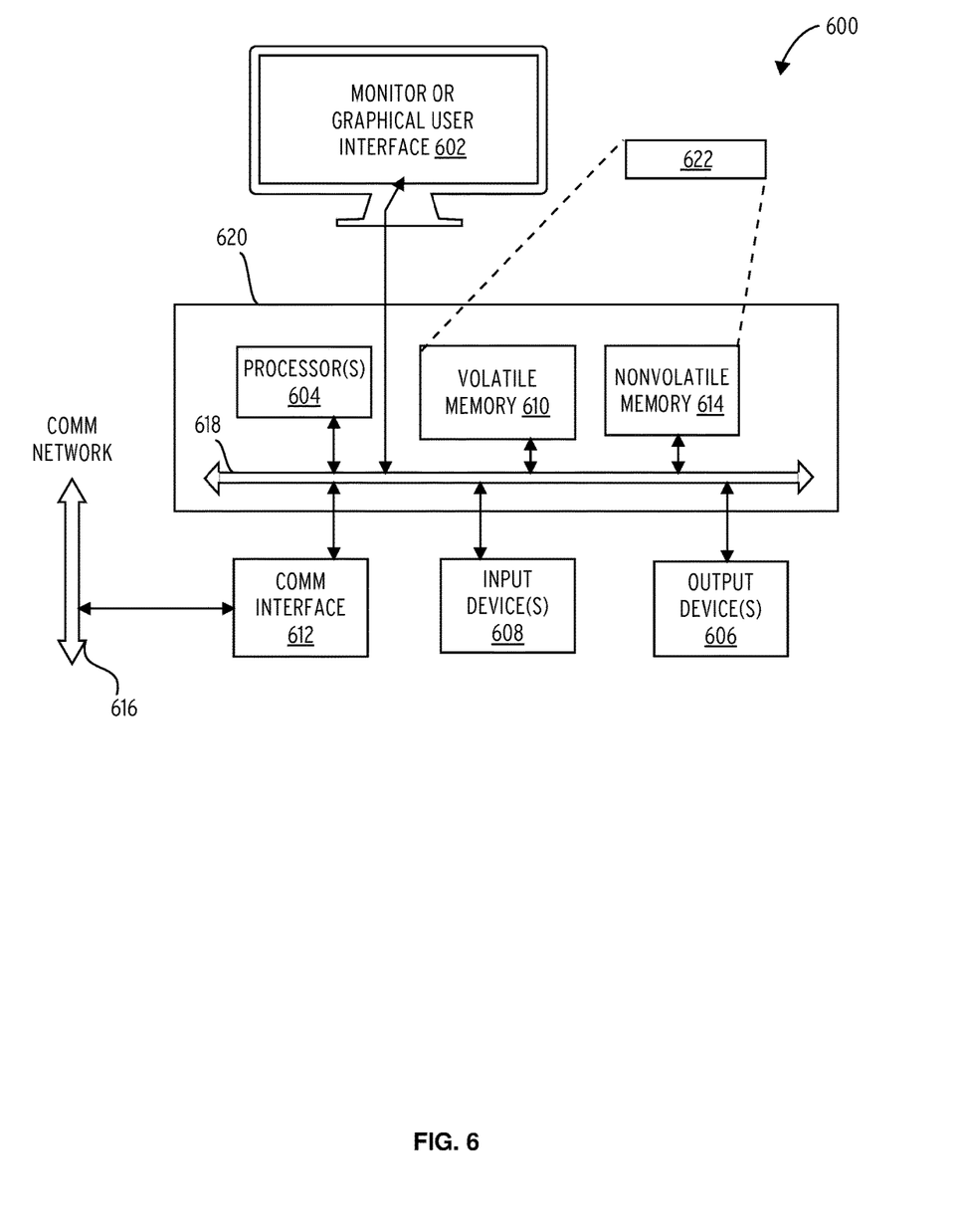
FIG. 6 is an example block diagram of a computing device 600 that may incorporate embodiments of the present invention.

FIG. 6 is an example block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 620, a communication network interface 612, input device(s) 608, output device(s) 606, and the like.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said software may be read from the volatile memory 610 and/or nonvolatile memory 614 and executed by the processor(s) 604. The volatile memory 610 and the nonvolatile memory 614 may also provide a repository for storing data used by the software.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Figure 7:
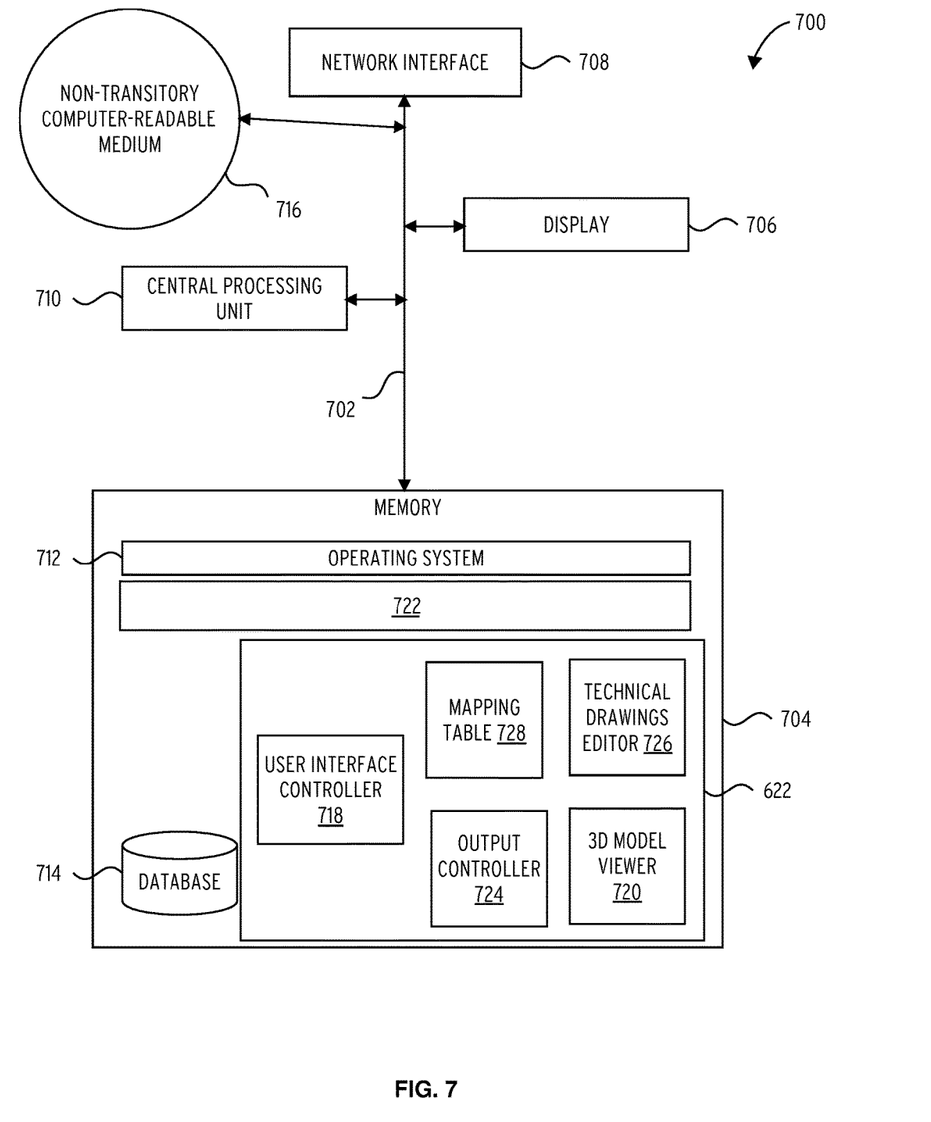
FIG. 7 illustrates a server 700 in accordance with one embodiment.

FIG. 7 illustrates several components of an exemplary server 700 in accordance with one embodiment. In various embodiments, server 700 may include a desktop PC, server, workstation, mobile phone, laptop, tablet, set-top box, appliance, or other computing device that is capable of performing operations such as those described herein. In some embodiments, server 700 may include many more components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 700 may comprise one or more physical and/or logical devices that collectively provide the functionalities described herein. In some embodiments, server 700 may comprise one or more replicated and/or distributed physical or logical devices.

In some embodiments, server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 700 includes a bus 702 interconnecting several components including a network interface 708, a display 706, a central processing unit 710, and a memory 704.

Memory 704 generally comprises a random access memory ("RAM") and permanent non-transitory mass storage device, such as a hard disk drive or solid-state drive. Memory 704 stores an operating system 712. In some embodiments, the memory 704 stores logic 622 comprising logic for a process for capturing multiple 3d object perspectives into a multilayered two dimensional display 722, a user interface controller 718, mapping table 728, an output controller 724, a technical drawings editor 726, and a 3D model viewer 720.

These and other software components may be loaded into memory 704 of server 700 using a drive mechanism (not shown) associated with a non-transitory computer-readable medium 716, such as a floppy disc, tape, DVD/CD-ROM drive, memory card, or the like.

Memory 704 also includes database 714. In some embodiments, server 700 may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:
1. A method comprises:
configuring a three dimensional (3D) model viewer in a first cloud with graphical data from a 3D model comprising the graphical data for at least two constituent parts from a controlled memory data structure;
operating the 3D model viewer to:
construct the 3D model in a 3D virtual environment from the graphical data viewed through a 3D positionable viewing frustum configured by a projection view control from a user interface controller;

generate a graphical projection of the 3D model through the 3D positionable viewing frustum with projection calculations distributed to a plurality of processors on the first cloud; and render the graphical projection through a 3D environment viewer interface in a graphical user interface (GUI);

configuring and operating an output controller with an export control from the user interface controller to:

generate an edge wireframe projection from the projection view control and the graphical data through operation of the plurality of processors on the first cloud; and export the edge wireframe projection to a technical drawings editor in a second cloud;

operating the technical drawings editor to:

extract constituent part names from the edge wireframe projection and assemble projected components list through control of a constructor;

display the edge wireframe projection as a background layer of a technical drawing through a drawings editor panel and the projected components list in a component list panel in the GUI; and display component identifiers each linked to a different constituent part name of the projected components list in a user-configurable foreground layer in the drawings editor panel.

2. The method of claim 1, wherein generating the graphical projection of the at least two constituent parts of the 3D model through the 3D positionable viewing frustum through the projection calculations distributed to the plurality of processors on the first cloud comprises culling the graphical data corresponding to subregions of the 3D model outside of the 3D positionable viewing frustum.

3. The method of claim 1, wherein generating the edge wireframe projection from the projection view control and the graphical data through operation of the plurality of processors on the first cloud comprise:

configuring the output controller to operate a hidden line removal algorithm to generate the edge wireframe projection in response to detecting a surface occlusion control in the export control; and culling the graphical data corresponding to subregions of the 3D model obscured by occluding surfaces of the 3D model through the 3D positionable viewing frustum.

4. The method of claim 1, wherein the controlled memory data structure comprises a cloud storage controlled memory data structure.

5. The method of claim 1 comprises:

configuring the constituent part names displayed in the component list panel as editable text nodes stored in a mapping table;

generating an update control through the user interface controller in response to detecting changes to an editable text node; and operating the mapping table to rename the constituent part names of the 3D model stored in the controlled memory data structure as controlled by the update control.

6. A non-transitory computer-readable storage medium, the computer-readable storage medium including instructions that when executed by a computer, cause the computer to:

configure a three dimensional (3D) model viewer in a first cloud with graphical data from a 3D model comprising the graphical data for at least two constituent parts from a controlled memory data structure;

operate the 3D model viewer to:

construct the 3D model in a 3D virtual environment from the graphical data viewed through a 3D positionable viewing frustum configured by a projection view control from a user interface controller;

generate a graphical projection of the 3D model through the 3D positionable viewing frustum with projection calculations distributed to a plurality of processors on the first cloud; and render the graphical projection through a 3D environment viewer interface in a graphical user interface (GUI);

configure and operate an output controller with an export control from the user interface controller to:

generate an edge wireframe projection from the projection view control and the graphical data through operation of the plurality of processors on the first cloud; and export the edge wireframe projection to a technical drawings editor in a second cloud;

operate the technical drawings editor to:

extract constituent part names from the edge wireframe projection and assemble projected components list through control of a constructor;

display the edge wireframe projection as a background layer of a technical drawing through a drawings editor panel and the projected components list in a component list panel in the GUI; and display component identifiers each linked to a different constituent part name of the projected components list in a user-configurable foreground layer in the drawings editor panel.

7. The computer-readable storage medium of claim 6, wherein generating the graphical projection of the at least two constituent parts of the 3D model through the 3D positionable viewing frustum through the projection calculations distributed to the plurality of processors on the first cloud comprises cull the graphical data corresponding to subregions of the 3D model outside of the 3D positionable viewing frustum.

8. The computer-readable storage medium of claim 6, wherein generating the edge wireframe projection from the projection view control and the graphical data through operation of the plurality of processors on the first cloud comprise:

configure the output controller to operate a hidden line removal algorithm to generate the edge wireframe projection in response to detecting a surface occlusion control in the export control; and cull the graphical data corresponding to subregions of the 3D model obscured by occluding surfaces of the 3D model through the 3D positionable viewing frustum.

9. The computer-readable storage medium of claim 6, wherein the controlled memory data structure comprises a cloud storage controlled memory data structure.

10. The computer-readable storage medium of claim 6 comprises:

configure the constituent part names displayed in the component list panel as editable text nodes stored in a mapping table;

generate an update control through the user interface controller in response to detecting changes to an editable text node; and operate the mapping table to rename the constituent part names of the 3D model stored in the controlled memory data structure as controlled by the update control.

11. A computing apparatus, the computing apparatus comprising:

a processor; and a memory storing instructions that, when executed by the processor, configure the apparatus to:

configure a three dimensional (3D) model viewer in a first cloud with graphical data from a 3D model comprising the graphical data for at least two constituent parts from a controlled memory data structure;

operate the 3D model viewer to:

construct the 3D model in a 3D virtual environment from the graphical data viewed through a 3D positionable viewing frustum configured by a projection view control from a user interface controller;

generate a graphical projection of the 3D model through the 3D positionable viewing frustum with projection calculations distributed to a plurality of processors on the first cloud; and render the graphical projection through a 3D environment viewer interface in a graphical user interface (GUI);

configure and operate an output controller with an export control from the user interface controller to:

generate an edge wireframe projection from the projection view control and the graphical data through operation of the plurality of processors on the first cloud; and export the edge wireframe projection to a technical drawings editor in a second cloud;

operate the technical drawings editor to:

extract constituent part names from the edge wireframe projection and assemble projected components list through control of a constructor;

display the edge wireframe projection as a background layer of a technical drawing through a drawings editor panel and the projected components list in a component list panel in the GUI; and display component identifiers each linked to a different constituent part name of the projected components list in a user-configurable foreground layer in the drawings editor panel.

12. The computing apparatus of claim 11, wherein generating the graphical projection of the at least two constituent parts of the 3D model through the 3D positionable viewing frustum through the projection calculations distributed to the plurality of processors on the first cloud comprises cull the graphical data corresponding to subregions of the 3D model outside of the 3D positionable viewing frustum.

13. The computing apparatus of claim 11, wherein generating the edge wireframe projection from the projection view control and the graphical data through operation of the plurality of processors on the first cloud comprise:

configure the output controller to operate a hidden line removal algorithm to generate the edge wireframe projection in response to detecting a surface occlusion control in the export control; and cull the graphical data corresponding to subregions of the 3D model obscured by occluding surfaces of the 3D model through the 3D positionable viewing frustum.

14. The computing apparatus of claim 11, wherein the controlled memory data structure comprises a cloud storage controlled memory data structure.

15. The computing apparatus of claim 11 comprises:

configure the constituent part names displayed in the component list panel as editable text nodes stored in a mapping table;

generate an update control through the user interface controller in response to detecting changes to an editable text node; and operate the mapping table to rename the constituent part names of the 3D model stored in the controlled memory data structure as controlled by the update control.

* * * * *